United States Patent [19]

Arai et al.

[11] Patent Number: 4,565,734
[45] Date of Patent: Jan. 21, 1986

[54] MAGNETIC RECORDING MEDIUM

[75] Inventors: Yoshihiro Arai; Akira Nahara; Kiyotaka Fukino, all of Odawara, Japan

[73] Assignee: Fuji Photo Film Co., Ltd., Kanagawa, Japan

[21] Appl. No.: 589,553

[22] Filed: Mar. 14, 1984

[30] Foreign Application Priority Data

Mar. 18, 1983 [JP] Japan .................................. 58-45717

[51] Int. Cl.⁴ .............................................. G11B 5/72
[52] U.S. Cl. ...................................... 428/216; 360/134; 360/135; 360/136; 427/41; 427/131; 427/132; 428/336; 428/422; 428/461; 428/463; 428/469; 428/472; 428/694; 428/695; 428/900
[58] Field of Search ................... 427/41, 38, 131, 132; 428/694, 695, 900, 336, 216, 469, 472, 422, 461, 463; 360/134–136

[56] References Cited

U.S. PATENT DOCUMENTS

| 4,382,985 | 5/1983 | Hattori | 427/41 |
| 4,395,435 | 7/1983 | Sampei | 427/41 |
| 4,419,404 | 12/1983 | Arai | 427/41 |
| 4,421,843 | 12/1983 | Hattori | 427/41 |
| 4,429,024 | 1/1984 | Ueno | 427/41 |
| 4,521,482 | 6/1985 | Arai | 428/412 |

Primary Examiner—Ellis P. Robinson
Attorney, Agent, or Firm—Murray, Whisenhunt & Ferguson

[57] ABSTRACT

A magnetic recording medium comprises a non-magnetic substrate, a thin magnetic metal film layer overlaid on the substrate, a metallic oxide layer formed on the surface of the thin magnetic metal film layer, and a polymer film formed by plasma polymerization. The polymer film is overlaid on the metallic oxide layer to improve the corrosion resistance and durability of the magnetic recording medium.

10 Claims, 3 Drawing Figures

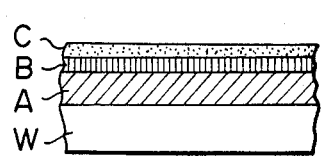
FIG.1
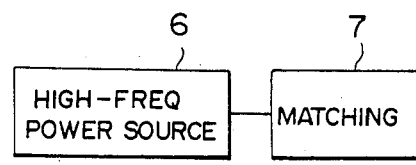
FIG.2
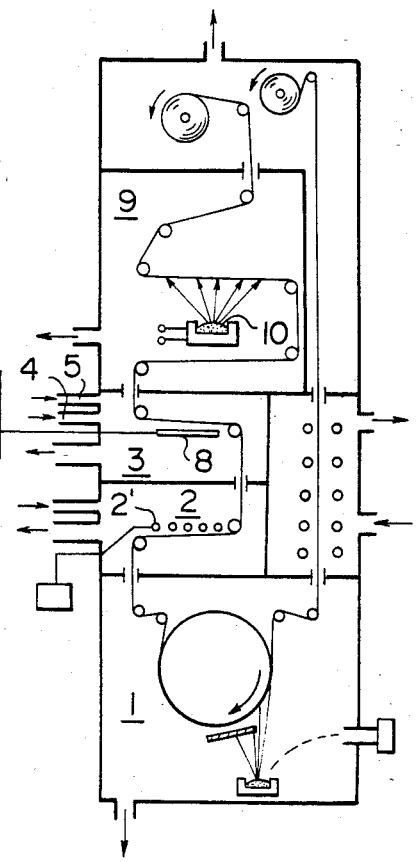
FIG.3
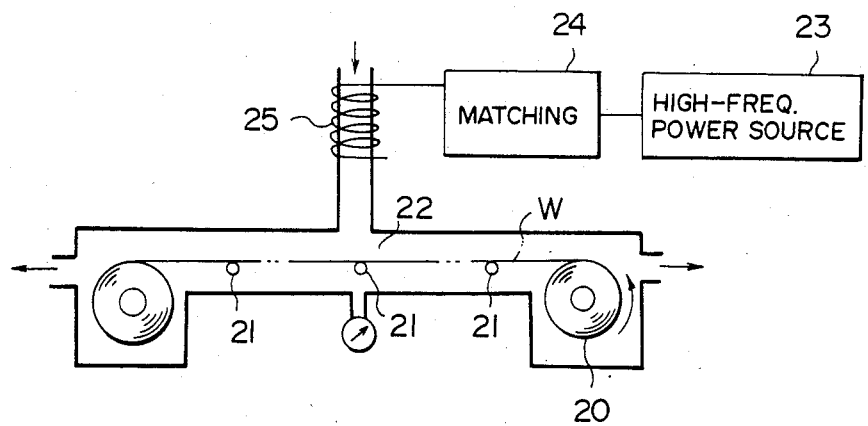

MAGNETIC RECORDING MEDIUM

BACKGROUND OF THE INVENTION

1. Field of the Invention

This invention relates to a magnetic recording medium for use in a magnetic recording apparatus using a magnetic tape, magnetic disk, or the like. This invention particularly relates to a thin metal film type magnetic recording medium exhibiting improved corrosion resistance and durability.

2. Description of the Prior Art

Many of the conventional magnetic recording media are of the so-called coating type and are made by using powdered magnetic materials such as magnetic oxide particles such as $\gamma\text{-}Fe_2O_3$, Co-doped $\gamma\text{-}Fe_2O_3$, $Fe_3O_4$, Co-doped $Fe_3O_4$, Berthollide compounds of $\gamma\text{-}Fe_2O_3$ and $Fe_3O_4$, Co-doped Berthollide compounds, or $CrO_2$, or magnetic alloy particles containing, as main constituents, Fe, Ni, Co and the like. These powdered magnetic materials are dispersed in organic binders such as vinyl chloride-vinyl acetate copolymers, styrene-butadiene copolymers, epoxy resins and polyurethane resins. The dispersions thus obtained are then applied to non-magnetic substrates and dried to form the magnetic recording media.

Recently, so-called thin metal film type magnetic recording media using no binders have attracted attention because of their ability to meet strong demand for high density recording. The magnetic recording media of this type have magnetic recording layers which consist of thin ferromagnetic metal films formed by a process such as vacuum deposition, sputtering, ion plating or plating. Thus various efforts are being made to develop thin metal film type magnetic recording media suitable for practical use.

In general, however, the thin ferromagnetic metal film layers have a drawback that the film layers are readily corroded, and therefore the storage stability thereof is not good. Further, when the magnetic recording media comprising thin ferromagnetic metal films are used as magnetic tapes and moved in magnetic recording and reproducing apparatus, the thin ferromagnetic metal film layers are readily scratched by contact with the magnetic head or guide posts of the apparatus.

SUMMARY OF THE INVENTION

The primary object of the present invention is to provide a thin metal film type magnetic recording medium exhibiting improved corrosion resistance and good storage stability.

Another object of the present invention is to provide a thin metal film type magnetic recording medium exhibiting improved durability and high resistance to scratching.

The magnetic recording medium in accordance with the present invention comprises a non-magnetic substrate, a thin magnetic metal film layer formed on said non-magnetic substrate, a metallic oxide layer formed on the surface of said thin magnetic metal film layer, and a polymer film formed by plasma polymerization which is overlaid on said metallic oxide layer so as to cover said metallic oxide layer.

In the magnetic recording medium of the present invention, since the metallic oxide layer is overlaid on the surface of the thin magnetic metal film layer, adhesion of the polymer film formed by plasma polymerization to the thin magnetic metal film layer is improved.

Further, since the magnetic recording medium is provided with the metallic oxide layer exhibiting good corrosion resistance and the polymer film formed by plasma polymerization which exhibits high uniformity and which has few pin holes, the corrosion resistance of the magnetic recording medium is improved markedly. As a result, the magnetic recording medium of the present invention is almost totally free of corrosion arising through pin holes in an overcoat layer as occur in the case of the conventional magnetic recording medium. This is presumably because the polymer film formed by plasma polymerization has the ability of preventing hydroxyl group $(OH^-)$ from entering the thin magnetic metal film layer, thereby protecting the thin magnetic metal film layer from corrosion. In the conventional magnetic recording medium, since hydroxyl group $(OH^-)$ entering through pin holes in the overcoat layer directly contacts the surface of the thin magnetic metal film layer and rapidly penetrates from the surface into the interior of the thin magnetic metal film layer, the thin magnetic metal film layer is readily corroded, and corrosion proceeds rapidly.

In the magnetic recording medium of the present invention, even when the polymer film formed by plasma polymerization has pin holes and hydroxyl group $(OH^-)$ enters through the pin holes, penetration of the hydroxyl group $(OH^-)$ into the thin magnetic metal film layer is prevented by the metallic oxide layer overlaid on the surface of the thin magnetic metal film layer. Accordingly, the thin magnetic metal film layer is not readily corroded, and it takes a very long time for corrosion to proceed to the interior of the thin magnetic metal film layer.

Further, since the thin magnetic metal film layer of the magnetic recording medium in accordance with the present invention is covered by the polymer film formed by plasma polymerization which is crosslinked to a high extent and exhibits a high strength, the magnetic recording medium exhibits good durability and high resistance to scratching.

The present invention will hereinbelow be described in further detail with reference to the accompanying drawings.

BRIEF DESCRIPTION OF THE DRAWINGS

FIG. 1 is an explanatory view schematically showing the configuration of an embodiment of the magnetic recording medium in accordance with the present invention, FIG. 2 is a schematic view showing an embodiment of the apparatus for making the magnetic recording medium in accordance with the present invention, and FIG. 3 is a schematic view showing another embodiment of the apparatus for making the magnetic recording medium in accordance with the present invention.

DETAILED DESCRIPTION OF THE INVENTION

Referring to FIG. 1, the magnetic recording medium comprises a non-magnetic substrate W, a thin magnetic metal film layer A, a metallic oxide layer B, and a polymer film C formed by plasma polymerization. The non-magnetic substrate should preferably be a plastic film made of polyethylene terephthalate, polyimide, polyamide, polyvinyl chloride, cellulose triacetate, polycarbonate, polyethylene naphthalate or the like. It is also possible to use a non-magnetic substrate made of a non-magnetic metal such as Al, Cu or SUS (stainless steel), or a mineral material such as glass or a ceramic material. Also, a layer comprising an organic binder and inorganic particles dispersed therein may be laid on the surface of the substrate W opposite to the thin magnetic metal film layer A.

The non-magnetic substrate W should more preferably be a flexible plastic film exhibiting surface roughness (ra) of 0.012 μm or less.

As the material of the thin magnetic metal film layer A, Co, or an alloy material such as Co-Ni, Co-Cr or Co-Ni-Cr, or a magnetic alloy material containing oxygen is used. The thin magnetic metal film layer A consisting of Co or an alloy containing Co is overlaid on the substrate W, for example, by an oblique incidence vacuum deposition process. The thickness of the thin magnetic metal film layer A is, for example, about 1,400 Å. The surface of the thin magnetic metal film layer A is covered by the metallic oxide layer B having a thickness, for example, within the range of 50 Å to 200 Å. To form the metallic oxide layer B on the surface of the thin magnetic metal film layer A, the surface of the thin magnetic metal film layer A may be oxidized by glow treatment in an oxygen gas atmosphere, by heat treatment in an oxygen atmosphere or in a steam atmosphere, by treatment with an aqueous solution, or the like. The metallic oxide layer B is then covered by the polymer film C formed by plasma polymerization. The thickness of the polymer film C formed by plasma polymerization should preferably be within the range of 20 Å to 800 Å. When the thin magnetic metal film layer A has the so-called columnar grain structures involving spaces therebetween, the polymer film C formed by plasma polymerization should preferably be overlaid so as to fill the spaces between the columnar grain structures. The polymer film C formed by plasma polymerization is obtained by plasma-polymerizing an organic material, for example, by directly ionizing an organic monomer gas near the surface of the metallic oxide layer B on the thin magnetic metal film layer A, or by introducing an organic monomer gas while electric discharge is conducted in an Ar gas atmosphere in the vicinity of the surface of the metallic oxide layer B. In general, since the polymer film C formed by plasma polymerization is crosslinked to a higher extent than is a polymer film obtained by the other polymerization reactions, the polymer film C exhibits a higher density and a higher strength than can be obtained by such other polymerization reactions. Also, even when the thickness of the polymer film C formed by plasma polymerization is relatively thin as described above, the polymer film C has fewer pin holes and exhibits higher uniformity than a polymer film obtained by the other polymerization reactions.

The organic monomer gas used for forming the polymer film C by plasma polymerization should preferably be tetrafluoromethane, tetrafluoroethylene, hexafluoroethane, perfluoropropane, octafluorocyclobutane, methane, ethylene, butylene, vinyl chloride, styrene, or chlorobenzene. Among these monomer gases, the most preferred are methane, ethylene, and tetrafluoroethylene.

The plasma of an organic material for forming the polymer film C can be generated by use of high frequency power, alternating current power, microwave power or the like in a vacuum within the range of 0.1 Torr. to 10 Torr. The plasma may be generated in a reaction chamber for conducting polymerization. Or, discharge may be conducted in Ar gas at an gas inlet section, and the electrons and ions generated by the discharge may be introduced into a reaction chamber, where the electrons and ions are contacted with the organic monomer gas to ionize the organic monomer gas.

In the present invention, in order to improve adhesion of the polymer film C formed by plasma polymerization, the polymer film C is overlaid on the thin magnetic metal film layer A with the metallic oxide layer B intervening therebetween. The metallic oxide layer B also has the ability of improving the corrosion resistance of the thin magnetic metal film layer A.

For practical use, a lubricating layer should preferably be overlaid on one surface or both surfaces of the magnetic recording medium in accordance with the present invention to improve movement smoothness and still durability of the magnetic recording medium. For example, when the lubricating layer is overlaid on the polymer film C formed by plasma polymerization, the lubricating layer should preferably be made of a higher fatty acid, or an ester of a fatty acid, or a combination of a higher fatty acid with an ester of a fatty acid. As the higher fatty acid used for this purpose, lauric acid, myristic acid, palmitic acid, stearic acid, behenic acid, oleic acid, linoleic acid, linolenic acid, arachidonic acid, or the like is preferable. As the ester of a fatty acid, methyl stearate, ethyl palmitate, stearic acid monoglyceride, or the like is preferable.

The lubricating layer may be applied by a deposition process, an ion plating process or an ordinary coating process.

The present invention will further be illustrated by the following nonlimitative examples. In Examples, a gas-introducing rate ($cm^3$/min) is measured under 1 atom at 20° C.

EXAMPLE 1

In a deposition chamber 1 of the apparatus as shown in FIG. 2, a thin magnetic metal film layer A having a thickness of 1,400 Å as shown in FIG. 1 was overlaid on a 23 μm-thick polyethylene terephthalate film (used as the non-magnetic substrate W) by oblique incidence vacuum deposition of an alloy having a composition of $Co_{0.8}Ni_{0.2}$ at an angle of incidence of 50°. Then, in an oxygen glow treatment chamber 2, a metallic oxide layer B having a thickness of 100 Å was overlaid on the surface of the thin magnetic metal film layer A in an oxygen gas atmosphere at $7 \times 10^{-2}$ Torr. Oxygen glow treatment was conducted by applying a voltage of $-1$ kV to electrodes 2'. Thereafter, in a polymerization chamber 3, a polymer film C was formed by plasma polymerization to a thickness of 100 Å on the metallic oxide layer C. To form the polymer film C, methane gas was introduced at a rate of 20 $cm^3$/minute from a gas inlet 4 into the polymerization chamber 3, Ar gas was introduced at a rate of 50 $cm^3$/minute from a gas inlet 5 thereinto, and plasma was generated in a vacuum of $5 \times 10^{-2}$ Torr. The plasma was generated by generating a high frequency power at 13.56 MHz by a high frequency power source 6, matching the high frequency power in a matching box 7, and then applying the matched high frequency power to an electrode 8. The high frequency power applied was 120 W.

In this example, in order to improve the movement smoothness of the magnetic recording medium, behenic acid was evaporated from a crucible 10 in a lubricant forming chamber 9, and a lubricating layer having a thickness of 100 Å was overlaid on the polymer film C formed by plasma polymerization.

The corrosion resistance of the magnetic recording medium prepared as described above was evaluated by maintaining the magnetic recording medium for two weeks in a thermo-apparatus at a temperature of 60° C. and relative humidity of 90%, and then examining the degree of corrosion arising in the magnetic recording medium. In this evaluation, the magnetic recording medium prepared as described above exhibited no corrosion. On the other hand, when the conventional magnetic recording medium was evaluated in the same manner, corrosion arose over the entire surface of the magnetic recording medium. Also, in an actual operation test conducted in a VHS system video tape recorder, scratches arising in the magnetic recording medium prepared as described above were far fewer than in the magnetic recording medium consisting of a substrate and a thin magnetic metal film layer overlaid on the substrate.

EXAMPLE 2

A thin magnetic metal film layer A was overlaid on a 23 μm-thick polyethylene terephthalate film in the same manner as described in Example 1, and then allowed to stand for 15 days in an oxygen atmosphere at a temperature of 40° C. to form a metallic oxide layer B on the thin magnetic metal film layer A. The thickness of the metallic oxide layer B thus formed was 70 Å. Thereafter, by using an apparatus as shown in FIG. 3, a polymer film C having a thickness of 100 Å was overlaid by plasma polymerization on the metallic oxide layer B. Formation of the polymer film C was conducted by conveying the substrate W along rollers 21 from a substrate feed chamber 20, and generating plasma of octafluorocyclobutane monomer ionized at a discharge section 22. The flow rate of octafluorocyclobutane gas was 25 cm$^3$/minute, and the discharge pressure was 0.45 Torr. Generation of plasma was conducted by generating a high frequency power at 13.56 MHz by a high frequency power source 23, matching the high frequency power in a matching box 24, and then applying the matched high frequency power to a coil 25. The high frequency power applied was 120 W.

The magnetic recording medium prepared as described above was evaluated in the same manner as described in Example 1. In this evaluation, no corrosion was observed, and it was found that the magnetic recording medium in accordance with the present invention exhibits corrosion resistance and durability markedly improved over those of a magnetic recording medium consisting of a substrate and a thin magnetic metal film layer overlaid on the substrate.

EXAMPLE 3

An alloy having a composition of $Co_{0.8}Ni_{0.2}$ was deposited upon a 23 μm-thick polyethylene terephthalate film by an oblique incidence vacuum deposition at an angle of incidence of 40°. The deposition process was conducted while oxygen gas was introduced at a rate of 600 cc/minute toward the surface of the polyethylene terephthalate film. In this manner, oxygen was introduced into the thin magnetic metal film layer A, and the surface of the layer A was oxidized to form a metallic oxide layer B. Auger electron spectroscopy revealed that the thickness of the metallic oxide layer B was 110 Å. Thereafter, a polymer film C was overlaid by plasma polymerization on the metallic oxide layer B in the same manner as in Example 2 so that the average thickness of the polymer film C would be 100 Å.

The magnetic recording medium prepared as described above was evaluated in the same manner as described in Example 1. In this evaluation, no corrosion was observed, and it was found that the magnetic recording medium in accordance with the present invention exhibits corrosion resistance and durability markedly improved over those of a magnetic recording medium consisting of a substrate and a thin magnetic metal film layer overlaid on the substrate.

We claim:

1. A magnetic recording medium comprising a non-magnetic substrate, a thin magnetic metal film layer provided on the surface thereof with a metallic oxide layer, and a polymer film formed by plasma polymerization which is overlaid on said metallic oxide layer so as to cover said metallic oxide layer.

2. A magnetic recording medium as defined in claim 1 wherein said non-magnetic substrate is a flexible plastic film exhibiting surface roughness of 0.012 μm or less.

3. A magnetic recording medium as defined in claim 1 wherein said thin magnetic metal film layer is composed of a material selected from the group consisting of cobalt, a cobalt alloy, and a cobalt alloy containing oxygen.

4. A magnetic recording medium as defined in claim 1 wherein said thin magnetic metal film layer has an obliquely deposited columnar grain structure.

5. A magnetic recording medium as defined in claim 1 wherein said thin magnetic metal film layer has a thickness of about 1,400 Å.

6. A magnetic recording medium as defined in claim 1 wherein said metallic oxide layer has a thickness within the range of about 50 Å to about 200 Å.

7. A magnetic recording medium as defined in claim 1 wherein said polymer film formed by plasma polymerization has a thickness within the range of 20 Å to 800 Å.

8. A magnetic recording medium as defined in claim 1 wherein said polymer film formed by plasma polymerization is prepared by polymerizing plasma of an organic monomer gas selected from the group consisting of methane, ethylene, tetrafluoroethylene, and octafluorocyclobutane.

9. A magnetic recording medium as defined in claim 1 wherein a lubricating layer is overlaid at least on the surface of said polymer film formed by plasma polymerization.

10. A magnetic recording medium as defined in claim 9 wherein said lubricating layer is composed of a material selected from the group consisting of a higher fatty acid, an ester of a fatty acid, and a combination of a higher fatty acid with an ester of a fatty acid.

* * * * *